Jan. 17, 1933.  H. GRAY  1,894,311
LOAD CARRYING VEHICLE
Filed June 14, 1932    2 Sheets-Sheet 2
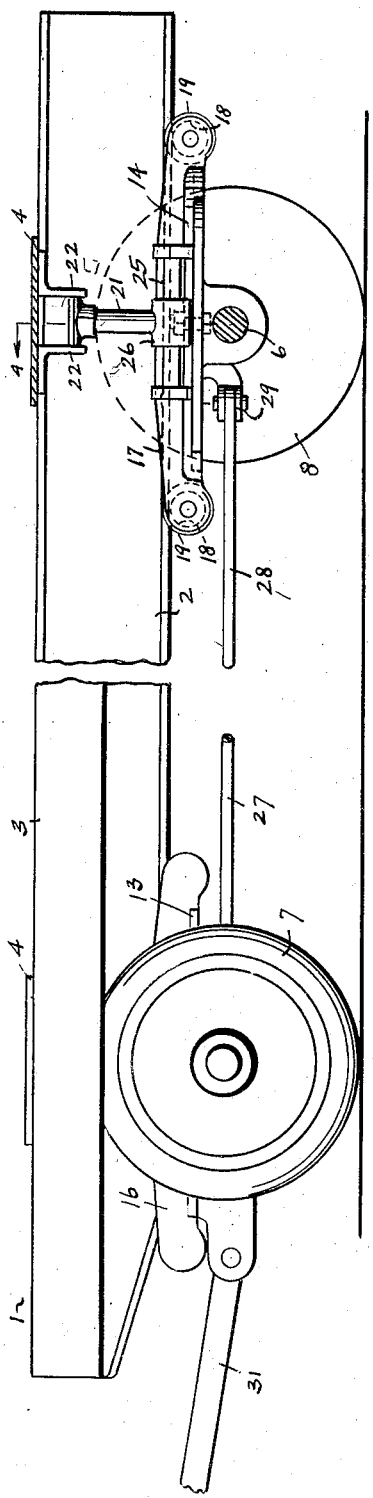
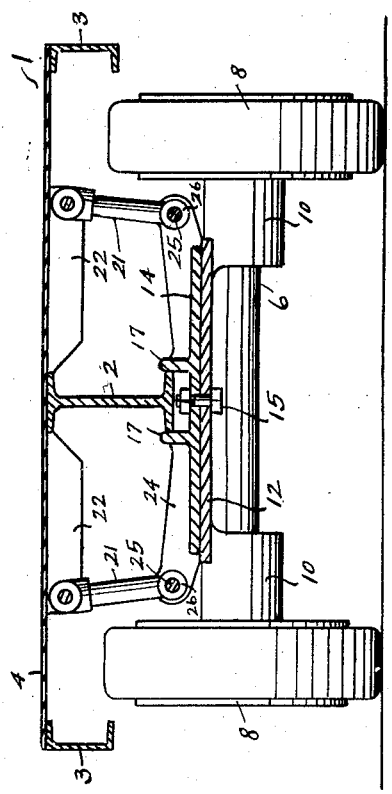
Fig. 3.
Fig. 4.
Inventor
Harry Gray
By Hurdway Cathey
Attorneys Patented Jan. 17, 1933

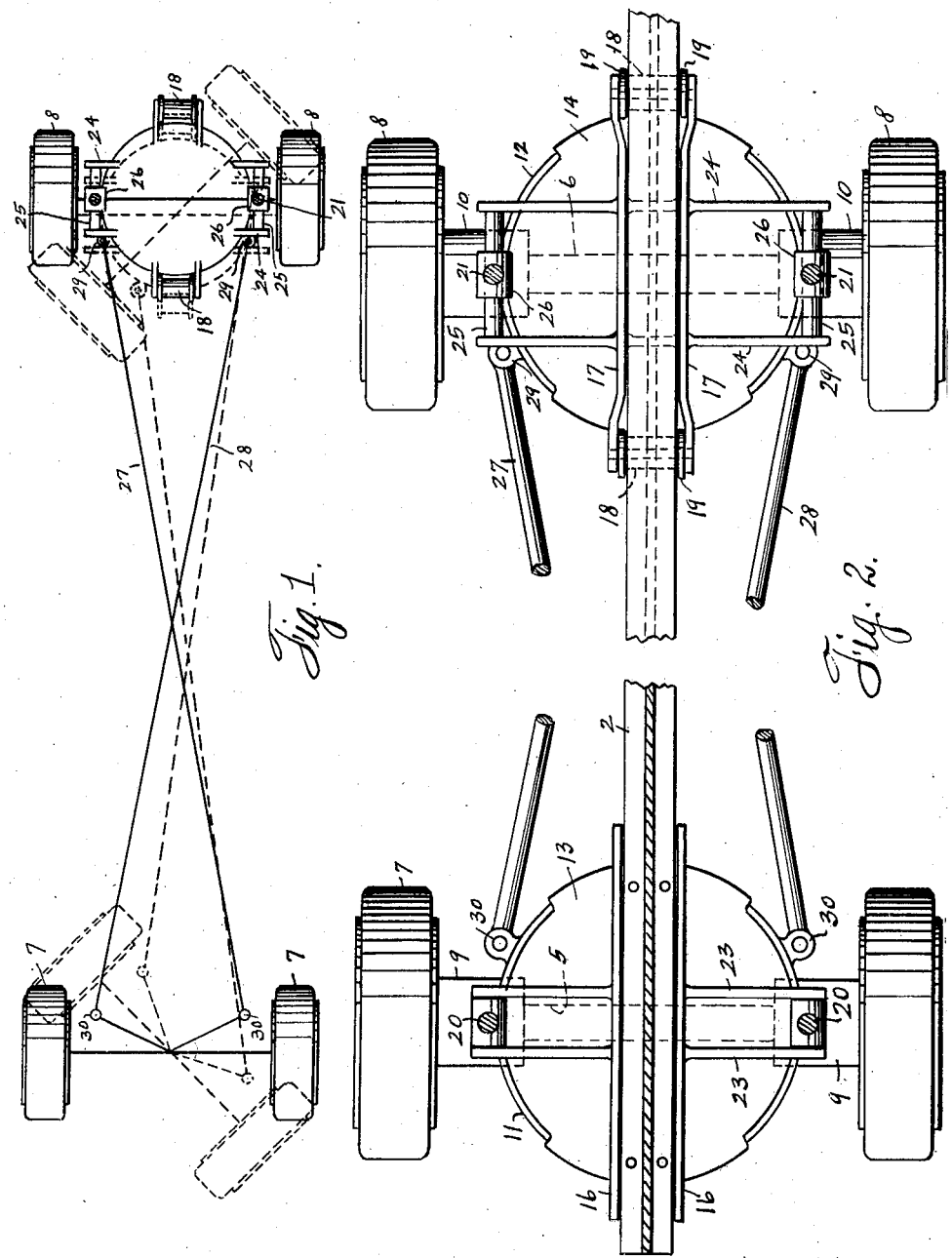

1,894,311

UNITED STATES PATENT OFFICE

HARRY GRAY, OF GALVESTON, TEXAS

LOAD CARRYING VEHICLE

Application filed June 14, 1932. Serial No. 617,150.

This invention relates to a load carrying vehicle.

An object of the invention is to provide a vehicle of the trailer type having a frame mounted in a novel manner on front and rear wheeled trucks connected by crossed steering rods to facilitate the easy turning of the vehicle.

Another object of the invention is to provide a vehicle of the character described wherein one of the trucks is adjustable relative to the frame to compensate for the variations in distance between the centers about which the trucks turn.

Another object is to provide a vehicle of this general type wherein the steering rods may be connected with the lower turn tables by means of close fitting, pivotal connections thus eliminating unnecessary play, and wear, between these connected parts and wherein the steering rods will not bind, or become bent but will have complete freedom of movement in making turns.

Another object of the invention is to provide a vehicle of the trailer type having novel means for mounting the frame on the trucks.

With the above and other objects in view this invention has particular relation to certain novel features of construction, operation and arrangement of parts, an example of which is given in this specification and illustrated in the accompanying drawings, wherein:

Figure 1 shows a diagrammatic plan view of the vehicle.

Figure 2 shows a fragmentary plan view thereof partly in section.

Figure 3 shows a side view and

Figure 4 shows a vertical sectional view taken on the line 4—4 of Figure 3.

Referring now more particularly to the drawings wherein like numerals of reference designate similar parts in each of the figures, there numeral 1 designates the frame as a whole.

In a preferred form of the invention this frame has a central longitudinal beam 2 preferably an I-beam and also the longitudinal side members 3, 3 preferably of the form of channel iron and of somewhat lighter construction than that of the central longitudinal beam. The central beam and the side members of the framework may be connected by cross plates as 4, 4. The numerals 5 and 6 designate the front and rear axles, respectively, which are supported by the front and rear ground wheels 7 and 8. These axles are mounted to rotate in suitable front and rear housings 9 and 10 which in turn support the front and rear lower turn tables 11 and 12 and the front and rear upper turn tables 13, 14 are mounted to turn relative to said respective lower turn tables. These upper and lower turn tables are connected to pivot about vertical axes by means of suitable king pins as 15.

The central longitudinal beam 2 is suitably secured by bolts or rivets, if desired, to the front upper turn table 13 and is fitted closely between the spaced upstanding longitudinal flanges 16, 16 on said last mentioned turn table.

The rear upper turn table 14 also has the longitudinal spaced upstanding flanges 17, 17 thereon between which said central longitudinal beam fits closely and the front and rear ends of said flanges 17, 17 are flared and mounted between said flared ends are the bearing rollers 18, 18 on which said central longitudinal beam rides. These rollers have the end flanges 19, 19 between which the lower flange of said central longitudinal beam fits closely.

There are the front and rear side supports 20, 20 and 21, 21. The upper ends of these side supports 20, 21 are suitably secured between the depending cross flanges as 22, 22 which depend from and are secured to the cross plates 4, 4 of the framework.

The lower ends of the side supports 20, are secured between the outer ends of the spaced cross flanges 23, 23 which are carried by and preferably integral with the upper turn table 13. The rear upper turn table 14 is provided with the upstanding spaced cross flanges 24, 24 which are preferably formed integrally therewith and between the outer ends of and supported by the cross flanges 24 are the guides 25, 25 on which the bearings 26, 26, into which the lower ends of the side supports 21, 21 are formed, are slidably mounted.

There are the cross steering rods 27, 28. The rear ends of these rods are pivotally connected to the brackets 29, 29 which are carried by the lower rear turn table and the forward ends of the steering rods are pivoted to the brackets 30, 30 carried by the lower front turn table.

The vehicle may be drawn by a suitable draft bar 31 suitably connected to the forward end of the vehicle. When the front truck is turned in one direction the cross steering rods will operate to turn the rear truck in the opposite direction to facilitate easy turning particularly when it is desirable to make short turns as when going around corners or when making a short turn when a number of trailers are connected into a train. When the front and rear trucks are making a curve the distance between the centers about which the turn tables pivot will vary from that between said centers when the vehicle is moving in a straight line as is more clearly shown in dotted lines in Figure 1. In order to compensate for this variation the rear end of the frame is mounted for longitudinal movement on the rear truck, in the manner hereinabove described.

The drawings and description discloses what is now considered to be a preferred form of the invention by way of illustration only while the broad principle of the invention will be defined by the appended claims.

What I claim is:

1. A vehicle comprising a frame, front and rear trucks on which the frame is mounted, crossed steering rods connecting said trucks and means for mounting the frame for limited longitudinal movement relative to one of said trucks.

2. A vehicle comprising a frame, front and rear trucks supporting said frame, said trucks being connected for pivotal movement about vertical axes relative to the frame, said frame having a limited longitudinal movement relative to one of said trucks.

3. A vehicle comprising a frame, front and rear trucks supporting said frame, said trucks being connected for pivotal movement about vertical axes relative to the frame, said frame having a limited longitudinal movement relative to one of said trucks, and crossed steering rods having pivotal connections with said trucks.

4. A vehicle having front and rear axles, ground wheels supporting said axles, a lower turn table on each axle, an upper turn table on each lower turn table, a frame supported by said upper turn tables, said frame being secured rigidly to one upper turn table and having a slidable connection with the other upper turn table.

5. A vehicle having front and rear axles, ground wheels supporting said axles, a lower turn table on each axle, an upper turn table on each lower turn table, a frame supported by said upper turn tables, said frame being secured rigidly to one upper turn table and having a slidable connection with the other upper turn table, and crossed steering rods connecting the lower turn tables.

6. A vehicle comprising front and rear axles, front and rear ground wheels supporting said axles, front and rear lower turn tables supported by the respective front and rear axles, front and rear upper turn tables, on said respective lower turn tables, a frame fixed to one upper turn table, means forming a slidable connection between the frame and the other upper turn table.

7. A vehicle comprising front and rear axles, front and rear ground wheels supporting said axles, front and rear lower turn tables supported by the respective front and rear axles, front and rear upper turn tables on said respective lower turn tables, a frame fixed to one upper turn table, means forming a slidable connection between the frame and the other upper turn table, and means connecting said respective front and rear turn tables for relative turning movement about vertical axes.

8. A vehicle comprising front and rear axles, front and rear ground wheels supporting said axles, front and rear lower turn tables supported by the respective front and rear axles, front and rear upper turn tables on said respective lower turn tables, a frame fixed to one upper turn table, means forming a slidable connection between the frame and the other upper turn table, means connecting said lower turn tables for simultaneous turning movement in opposite directions.

9. A vehicle comprising front and rear axles, front and rear ground wheels supporting said axles, front and rear lower turn tables supported by the respective front and rear axles, front and rear upper turn tables on said respective lower turn tables, a frame fixed to one upper turn table, means forming a slidable connection between the frame and the other upper turn table, means connecting said lower turn tables for simultaneous turning movement in opposite directions, and means connecting said respective upper and lower turn tables for relative turning movement about vertical axes.

10. In a vehicle having a frame and front and rear trucks supporting said frame; an upper turn table having anti-friction means on which the frame is mounted for longitudinal movement, means for limiting such movement and means turnable on a vertical axes for supporting said turn table.

11. A vehicle comprising front and rear wheeled trucks, a frame thereon, a lower turn table on one of said trucks, an upper turn table on said lower turn table, means for attaching said frame to the upper turn table, said attaching means permitting a limited longitudinal movement of the frame relative to the upper turn table.

12. A vehicle comprising front and rear wheeled trucks, a frame thereon, a lower turn table on one of said trucks, an upper turn table on said lower turn table, means for attaching said frame to the upper turn table, said attaching means permitting a limited longitudinal movement of the frame relative to the upper turn table, and antifriction means between said frame and upper turn table.

13. A vehicle comprising front and rear wheeled trucks, a lower turn table, on each truck, an upper turn table pivotal about a vertical axis on each lower turn table, each upper turn table having longitudinal, spaced retainers upstanding therefrom, a frame on said upper turn tables having a longitudinal beam between said retainers, means longitudinally adjustable on the rear upper turn table and attaching said frame to said last mentioned turn table, antifriction means between said beam and the rear turn table and side supports connecting the frame to the front upper turn table.

14. A vehicle comprising front and rear wheeled trucks, a frame thereon, a lower turn table on one of said trucks, an upper turn table on said lower turn table, means for attaching said frame to the upper turn table, said attaching means permitting a limited longitudinal movement of the frame relative to the upper turn table, antifriction means between said frame and upper turn table and steering means through which the turning movement of one truck in one direction is effective to simultaneously turn the other truck in another direction.

In testimony whereof I have signed my name to this specification.

HARRY GRAY.